(12) United States Patent
Shah

(10) Patent No.: US 7,946,440 B2
(45) Date of Patent: May 24, 2011

(54) TWO-PIECE EXPANDABLE SEALING PLUG

(75) Inventor: Bhaumik H. Shah, Amherst, NY (US)

(73) Assignee: KVT Koenig, LLC, Madison, CT (US)

( * ) Notice: Subject to any disclaimer, the term of this patent is extended or adjusted under 35 U.S.C. 154(b) by 801 days.

(21) Appl. No.: 11/983,852

(22) Filed: Nov. 13, 2007

(65) Prior Publication Data

US 2009/0120940 A1    May 14, 2009

(51) Int. Cl.
*B65D 53/00* (2006.01)
*B65D 41/32* (2006.01)
*B65D 41/04* (2006.01)
*B65D 39/00* (2006.01)

(52) U.S. Cl. ............... 220/234; 220/288; 220/DIG. 19; 220/238; 220/266; 220/363; 215/355; 215/356

(58) Field of Classification Search ............ 215/364, 215/253, 292, 334, 355; 220/235, 288, 260, 220/266, 237, 234, 233, 699, 694, 236, DIG. 19, 220/265, 238, 363; 138/89
See application file for complete search history.

(56) References Cited

U.S. PATENT DOCUMENTS

| | | | | |
|---|---|---|---|---|
| 2,051,235 A * | 8/1936 | Willis | ............... | 215/292 |
| 3,135,414 A | 6/1964 | Lee | | |
| 3,923,192 A * | 12/1975 | Walters | ............... | 220/235 |
| 5,078,294 A | 1/1992 | Staubli | | |
| 5,160,226 A | 11/1992 | Lee | | |
| 6,003,557 A | 12/1999 | Brelig et al. | | |
| 6,082,410 A | 7/2000 | Pohar | | |
| 6,098,725 A * | 8/2000 | David et al. | ............... | 175/58 |

FOREIGN PATENT DOCUMENTS

WO    WO 2009/064333 A3    5/2009

* cited by examiner

*Primary Examiner* — Robin Hylton
(74) *Attorney, Agent, or Firm* — Phillips Lytle LLP

(57) ABSTRACT

An elongated two-piece expandable sealing plug (20) that is adapted to sealingly close a marginal end portion of a hole or opening (22) provided in a body (21) broadly comprises: a cup-shaped member (23) having an annular open upper end, having an outer surface that is adapted to face toward a wall on the body surrounding the opening, and having an inner surface (38) that diverges radially outwardly in a direction toward the member upper end; and a head having an outer rim portion (25) mounted on the upper end marginal end portion of the member for rotation therewith, and having a central portion (26) arranged within, and secured to, the rim portion; wherein the member is adapted to be inserted (i.e., slidably and/or rotatively) into a marginal end portion of the body opening (FIG. 2); and wherein the central portion is adapted to be forcibly pushed toward the bottom of the cup-shaped member to (a) cause the central portion to physically separate from the rim portion, and (b) cause such separated central portion to movably engage the inner surface of the member to urge the member outer surface to move radially outwardly into engagement with the walls of the body about the opening (FIG. 4).

12 Claims, 3 Drawing Sheets

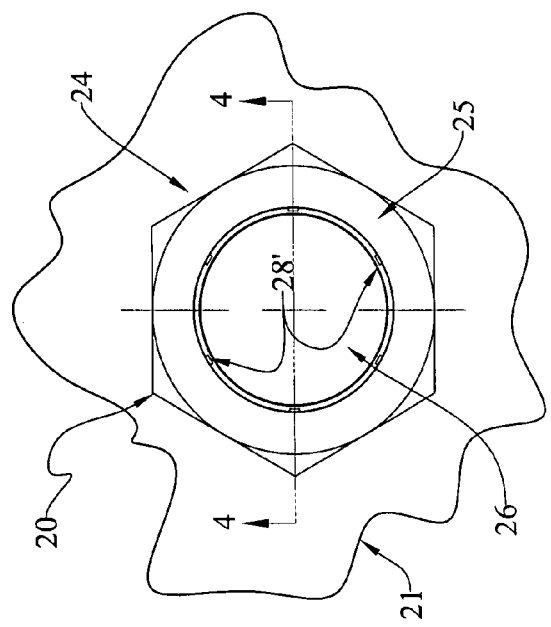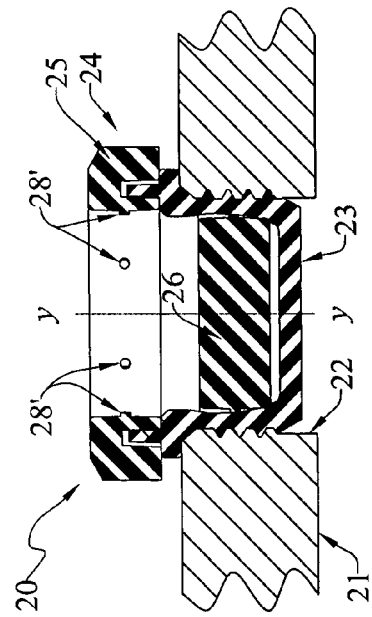
Fig. 3
Fig. 4
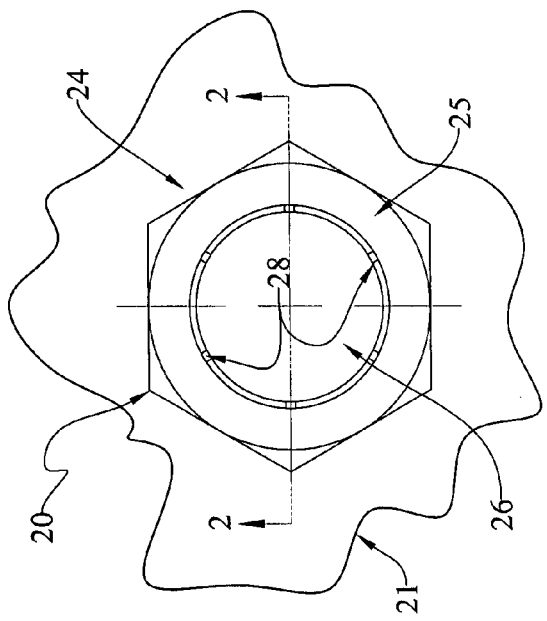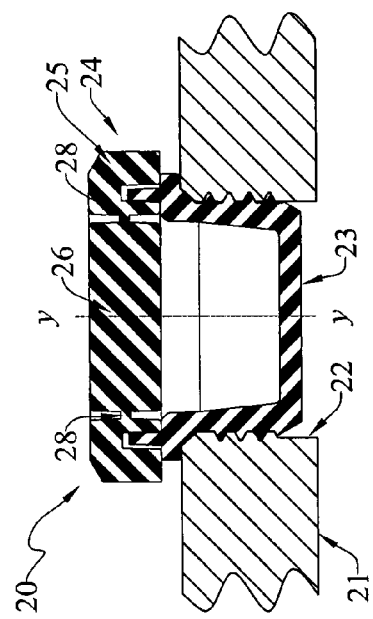
Fig. 1
Fig. 2

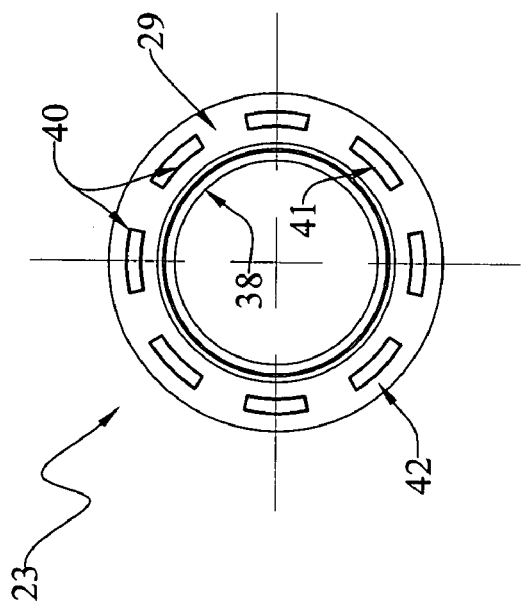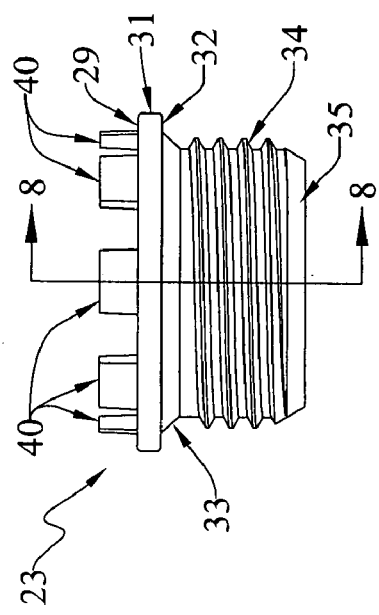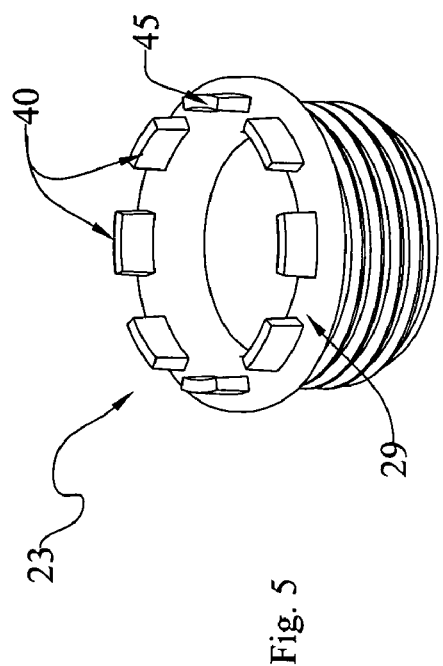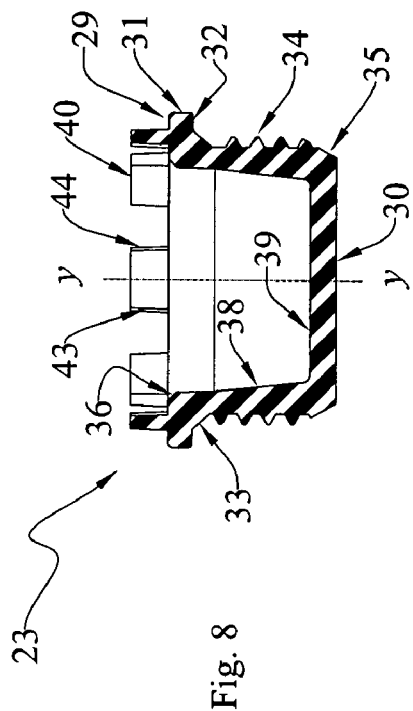

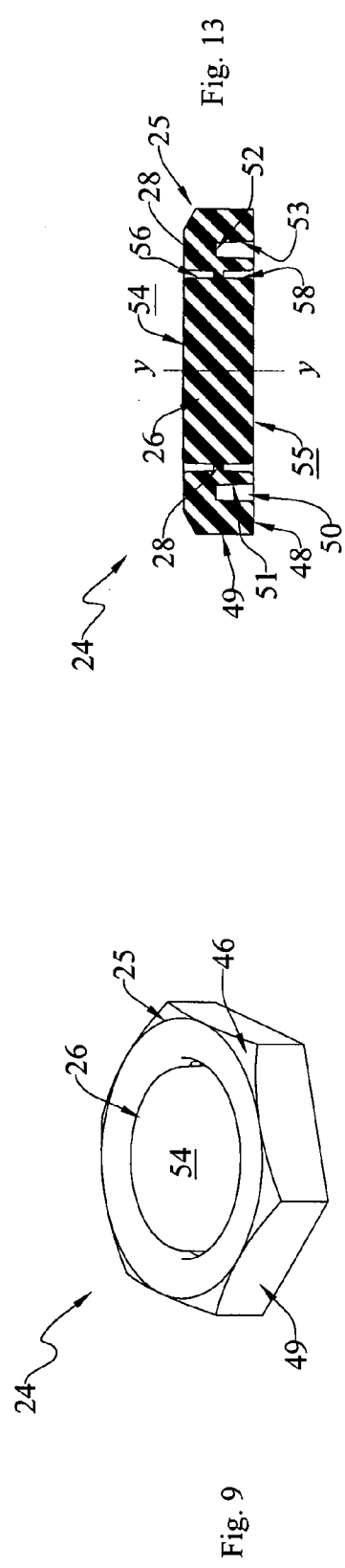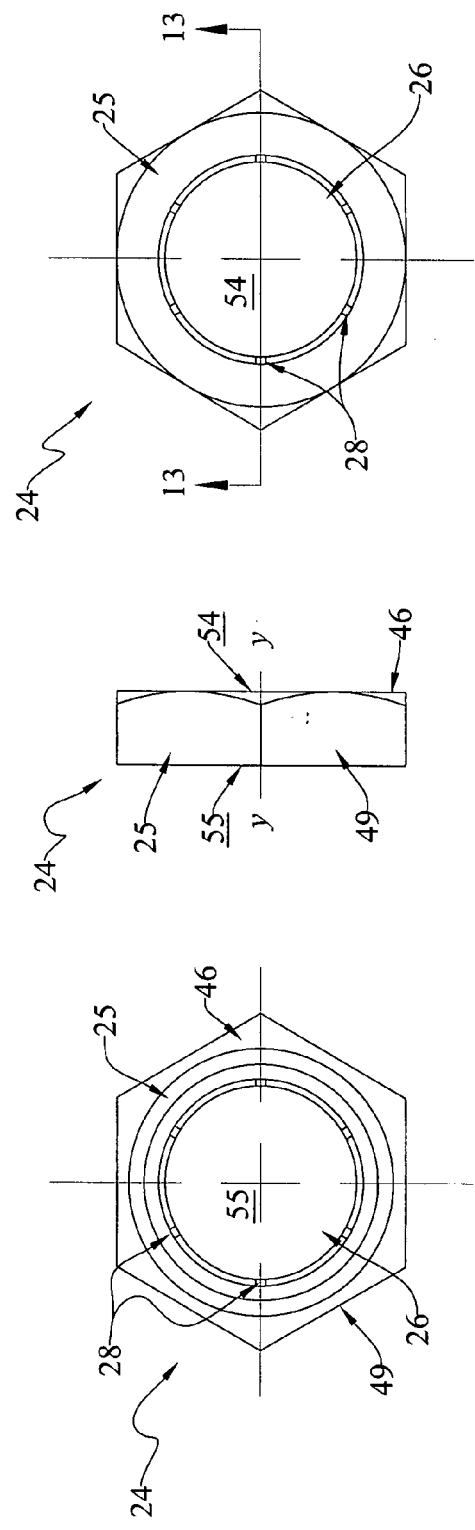

TWO-PIECE EXPANDABLE SEALING PLUG

TECHNICAL FIELD

The present invention relates generally to the field of sealing plugs and closures, and, more particularly, to improved two-piece expandable sealing plugs that are adapted to sealing close a marginal end portion of a hole or opening provided in a body.

BACKGROUND ART

It is often necessary to seal a marginal end portion of a hole or opening provided in a body. In some cases, the seal is intended to be permanent. In other cases, it is simply desired to provide a temporary seal, somewhat in the nature of a dust cover or the like.

One form of a permanent sealing plug, which is not adapted to be removed, is shown and described in U.S. Pat. No. 5,078,294. Another type of sealing plug, which professes to be removable, is shown and described in U.S. Pat. No. 6,003,557.

Still other types of sealing plugs are shown and described in U.S. Pat. Nos. 6,082,410, 5,160,226, and 3,135,414.

While the sealing plugs shown in the above patents provide species solutions to particular problems, it would be generally desirable to provide an improved low-cost easy-to-use sealing plug, which can be both easily inserted and readily removed from the body on which it is mounted.

DISCLOSURE OF THE INVENTION

With parenthetical reference to the corresponding parts, portions or surfaces of the disclosed embodiment, merely for purposes of illustration and not by way of limitation, the present invention broadly provides an elongated two-piece expandable sealing plug (20) that is adapted to sealingly close a marginal end portion of a hole or opening (22) provided in a body (21).

The improved sealing plug broadly comprises: a cup-shaped member (23) having an annular open upper end, having an outer surface that is adapted to face toward a wall on the body surrounding the hole or opening, having an inner surface (38) (FIG. 8) that diverges radially outwardly in an axial direction toward the member upper end, and having a bottom surface (39); and a head (24) having an outer rim portion (25) mounted on the upper end marginal end portion of the member for rotation therewith, and having a central portion (26) normally arranged within, and secured to, the peripheral rim portion; wherein the member is adapted to be inserted (i.e., slidably and/or rotatively) into a marginal end portion of the body hole or opening (FIG. 2); and wherein the central portion is adapted to be forcibly pushed toward the cup-shaped member bottom surface (39) to (a) cause the central portion (26) to physically separate from the peripheral rim portion (25), and (b) cause such separated central portion to movably engage the inner surface (38) of the member to urge the member outer surface to move radially outwardly into tighter engagement with the walls of the body about the opening (FIG. 4).

In the preferred embodiment, the hardness of the material of which the head is formed is greater than the hardness of the material of which the cup-shaped member is formed.

The member may be formed of a material selected from the group consisting of plastisol, vinyl, polyvinyl chloride, an elastomer, and urethane, and the head may be formed of a material selected from the group consisting of high-density polyethylene and nylon. However, these specific materials are only exemplary. The member and/or the head may be formed of other materials as well.

The central portion may be secured to the rim portion by a plurality of circularly-spaced frangible webs (28) positioned therebetween.

The body hole (22) may be internally-threaded, and the member outer surface may be externally-threaded. This too is merely exemplary. The body hole may have a cylindrical wall, a roughened or serrated wall, or may have some other shape or configuration. Similarly, the outer surface of the body may be threaded, serrated, ribbed, smooth, frusto-conical, or have some other shape or configuration.

The member (23) may be axially inserted into the marginal end portion of the body opening. Axial insertion of the member into the marginal end portion of the body opening may be facilitated by the spacing between the body wall and the member outer surface, and/or by the hardness of the cup-shaped member.

The rim portion may have a polygonal outer surface that is adapted to be grasped and rotated relative to the body. The rim portion may be rotated in one direction to move the plug into tighter engagement with the body, and may be rotated in the opposite direction to loosen the engagement of the member with the body, and ultimately to remove the plug from the body.

In the preferred embodiment, one of the member (23) and head rim portion (25) is provided with at least one recess, and the other of the member and rim portion is provided with at least one tab (40), and wherein the tab(s) is adapted to be received in the recess(es) to align the head with the cup-shaped member and to prevent relative rotation therebetween. The number and geometry of these tabs and/or slot(s) can be changed. Indeed, the two parts can be attached together by gluing, ultrasonic welding, laser welding, or some other technique, with our without such tab(s) and recess(es).

Accordingly, the general object of the invention is to provide an improved low-cost easy-to-use sealing plug.

Another object is to provide an improved two-piece expandable sealing plug that is adapted to sealingly close a marginal end portion of a hole or opening provided in a body.

These and other objects and advantages will become apparent from the foregoing and ongoing written specification, the drawings and the appended claims.

BRIEF DESCRIPTION OF THE DRAWINGS

FIG. 1 is a fragmentary top plan view of a first form of an improved sealing plug, as initially inserted into the body hole, this view particularly showing the central portion of the head as being arranged within, and secured to, the outer peripheral rim portion.

FIG. 2 is a fragmentary longitudinal vertical sectional view thereof, taken generally on line 2-2 of FIG. 1.

FIG. 3 is a fragmentary top plan view of the improved sealing plug, but showing the central portion of the head as having been forcibly pushed toward the bottom of the cup-shaped member to bow the side wall of the cup-shaped member radially outwardly into tighter engagement with the wall about the body opening.

FIG. 4 is a fragmentary longitudinal vertical longitudinal sectional view thereof, taken generally on line 4-4 of FIG. 3.

FIG. 5 is an isometric view of the cup-shaped member of the first embodiment shown in FIGS. 1-4.

FIG. 6 is a top plan view of the cup-shaped member shown in FIG. 5.

FIG. 7 is a front elevation of the cup-shaped member shown in FIGS. 5 and 6.

FIG. 8 is a fragmentary longitudinal vertical sectional view of the cup-shaped member, this view being taken generally on line 8-8 of FIG. 7.

FIG. 9 is an isometric view of the head of the improved sealing plug shown in FIGS. 1-4.

FIG. 10 is a top plan view of the head shown in FIG. 9.

FIG. 11 is a left side elevation of the head shown in FIG. 10.

FIG. 12 is a bottom plan view of the head shown in FIG. 11.

FIG. 13 is a longitudinal vertical sectional view of the head, taken generally on line 13-13 in FIG. 10, this view depicting the central portion as being mounted within, and secured to, the peripheral rim portion thereof.

DESCRIPTION OF THE PREFERRED EMBODIMENTS

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Turning now to the drawings, and more particularly, to FIGS. 1-4 thereof, the present invention broadly provides an improved vertically-elongated two-piece expandable sealing plug, of which the presently-preferred embodiment is generally indicated at 20. In FIGS. 1-4, the improved sealing plug is shown as being mounted on a body, generally indicated at 21, and as being used to sealingly close the upper marginal end portion of a vertically-elongated partially-threaded hole 22 provided therein. Body 21 is depicted as having an amorphous shape for illustrative purposes, and is not to be regarded as limitative of the shape, size or configuration of various bodies on which the plug may be mounted. As used herein, the word "body" is intended in a broad generic sense, and does not indicate any particular type of structure. Thus, the particular shape and configuration of body 21 shown in the drawings is simply one species of such a "body".

As best shown in FIGS. 2 and 4, the improved sealing plug is shown as being of a two-piece construction, and includes a lower cup-shaped member, generally indicated at 23, and an upper head, generally indicated at 24. The structure of the cup-shaped member is shown in greater detail in FIGS. 5-8, described infra. The structure of the head is shown in greater detail in FIGS. 9-13, described infra.

Adverting now to FIGS. 1-4, the head is shown as having an outer peripheral rim portion 25, and a central portion 26 positioned within the rim portion and secured thereto by a plurality of circularly-spaced frangible webs, severally indicated at 28. In FIGS. 1 and 2, the head central portion 26 is shown as being arranged within, and secured to the head outer rim portion 25. However, in FIGS. 3 and 4, the central portion 26 is shown as having been forcibly pushed downwardly toward the bottom of the cup-shaped member to cause the central portion 26 to separate from the rim portion 25, and to cause the side walls of the central portion to movably and slidably engage the inner surface of the cup-shaped member, to urge the member outer surface 34 to move radially outwardly into tighter engagement with the wall 21 of the body about the opening. In FIGS. 2 and 4, the sealing plug is shown as being elongated along vertical axis y-y.

Referring now to FIGS. 5-8, the cup-shaped member 23 is shown as being a vertically-elongated specially configured member having an upwardly-facing annular horizontal surface 29, a downwardly-facing horizontal circular bottom surface 30, an outer surface that sequentially includes (from top-to-bottom in FIG. 8): an outwardly-facing vertical cylindrical surface 31 extending downwardly from the outer margin of upper annular surface 29, a downwardly-facing annular horizontal surface 32, a downwardly- and outwardly-facing frusto-conical surface 33, an externally-threaded portion 34, and a downwardly- and outwardly-facing frusto-conical surface 35 continuing downwardly and inwardly therefrom to join the outer margin of bottom surface 30. The cup-shaped member is shown as having an inner surface which sequentially includes a upwardly- and inwardly-facing frusto-conical surface 36 extending downwardly from the inner margin of upper surface 29, and an inwardly- and upwardly-facing frusto-conical surface 38 continuing downwardly therefrom to join the outer margin of an upwardly-facing horizontal circular bottom surface 39. The portion of the cup-shaped member between surfaces 30, 39 define a bottom of the cup-shaped member. A plurality of truncated tabs, severally indicated at 40, extend upwardly from upper surface 29. As best shown in FIGS. 5 and 6, there are eight such tabs, and these are circularly spaced from one another. These various tabs are truncated in the sense that each tab includes an inner surface segment 41, an upwardly- and outwardly-facing frusto-conical surface segment 42, end surfaces 43, 44 which also extend upwardly and inwardly, and a top planar surface 45.

The cup-shaped member 23 is preferably formed of a material having a hardness less than the hardness of the head. Indeed, this material may be selected from the group consisting of plastisol, vinyl, polyvinyl chloride, and elastomer compound, and a urethane. It may also be selected of other materials as well. Indeed, the hardness of the cup-shaped member may be less than, equal to, or greater than the hardness of the material of which the head is formed.

Referring now to FIGS. 9-13, the head 24 has an outer peripheral rim portion 25, and a central portion 26 that is normally positioned within, and secured to, the rim portion by a plurality of circularly-spaced frangible webs, severally indicated at 28. More particularly, the rim portion is shown as having an upwardly-facing horizontal cylindrical surface 46, a downwardly-facing horizontal annular bottom surface 48, and an outwardly-facing polygonal surface 49 that is adapted to be grasped by a suitable turning tool (not shown), such as a wrench. An annular groove 50 extends upwardly into the rim portion from its lower surface 48. This groove is shown as being bounded by an outwardly- and downwardly-facing frusto-conical surface 51, an downwardly-facing annular bottom surface 52, and an upwardly- and inwardly-facing frusto-conical surface 53. Annular groove 50 is adapted to receive insertion of tabs 40 to initially align the head with respect to the cup-shaped member. The joint or connection between these parts can be made fast by gluing, welding or the like, to prevent relative rotation between the head and cup-shaped member. In the illustrated form, groove 50 is annular and continuous. However, groove 50 could alternatively be formed as a circularly-spaced series of recesses, each of which is arranged to receive insertion of one of tabs 40.

The head central portion 26 is shown as being bounded by an upper horizontal circular surface 54, a horizontal circular bottom surface 55, an outwardly-facing vertical cylindrical surface 56 above web 28, and an outwardly-facing vertical cylindrical surface 58 below web 28 (FIG. 4). Web 28 is shown as being integrally formed with the rim portion and the central portion. As indicated above, web 28 is intended to be frangible such that a suitable tool (not shown) may be used to push the central portion downwardly into the cup-shaped member. Thus, in FIG. 4, the remaining portions of frangible webs 28 are severally indicated at 28'. The head may be initially formed to have annular grooves extending downwardly and upwardly into the head from its upper and lower surfaces 54, 55, respectively, to define the boundaries between the central portion and outer rim portion. The head is formed of a relatively hard material, such as high-density polyethylene or nylon. However, these materials are exemplary only. It is presently preferred that the head be formed of a material having a hardness greater than that of the cup-shaped member, but this is not invariable.

Adverting now to FIGS. 2 and 4, the sealing plug may be initially inserted (either axially or rotatively, or both) into the body opening, as shown in FIG. 2. Thereafter, a suitable tool may be used to drive the head central portion downwardly toward the bottom of the cup-shaped member. This physically causes the central portion to separate from the peripheral rim. Moreover, when the central portion is moved downwardly, walls 56 and/or 58 thereof slidably engage the frusto-conical inner wall 38 of the cup-shaped member. Thus, as the central portion is moved downwardly, the central portion outer walls urge the outer walls of the cup-shaped member to move outwardly into tighter engagement with the walls of the body surrounding the opening.

As noted above, the head is preferably formed of a relative hard plastic material, and the cup-shaped member is formed of a less hard plastic material. The cup-shaped member may be sized relative to the size of the body hole such that the cup-shaped member may be simply axially pushed into the hole. To this extent, the relatively soft material of the cup-shaped member will deform as needed. Thereafter, when the central portion is pushed downwardly, the side wall of the cup-shaped member will be pushed radially outwardly into tighter engagement with the walls of the body about the opening.

While the preferred embodiment is shown as having external threads on the outer surface of the cup-shaped member, this is not invariable. The outer surface of the cup-shaped member could be simply cylindrical, or could have some other shape or configuration. The salient feature here is that the outer surface of the cup-shaped member, whatever its shape, will be moved radially outwardly into tighter engagement with the walls defining the body opening, when the central portion is pushed downwardly toward the bottom.

Once initially positioned, a suitable turning tool, such as a wrench, may engage the polygonal outer surface of the head portion. This turning tool may be rotated in one direction to tighten the sealing plug onto the body. Alternatively, the plug may be rotated in the opposite direction, whether the central portion is in the undisplaced position shown in FIG. 2, or in the displaced position shown in FIG. 4, to loosen and possibly remove the sealing plug from the body.

Modifications

As previously indicated, many changes and modifications may be made. For example, it is presently preferred that the head and cup-shaped member be formed of suitable plastic or elastomeric materials. However, this may be changed. It is also presently-preferred that the material of which the head is constructed be harder then the material of which the cup-shaped member is constructed. However, this is not invariable. In some forms, the head and cup-shaped member may be formed of the same materials. In other cases, the cup-shaped member may be formed of a material having a hardness greater than, or less than, the hardness of the material of which the head is formed. The shape and configuration of the head and cup-shaped member may also be changed, as desired. The outer surface may be externally-threaded, partially-threaded, serrated, provided with teeth, smooth, etc., as desired. The number, size, spacing and shape of the frangible portions may also be changed. Indeed, while the use of such frangible portions to hold the central portion within the rim portion is presently-preferred, the central portion may be held or secured within the outer rim portion by other means, as desired.

Therefore, while the presently-preferred form of the improved expandable sealing plug has been shown and described, and several changes and modifications thereof discussed, persons skilled in this art will readily appreciate that various additional changes and modifications may be made without departing from the spirit of the invention, as defined and differentiated by the following claims.

What is claimed is:

1. An elongated two-piece expandable sealing plug adapted to sealingly close a marginal end portion of a hole provided in a body, comprising:
    a cup-shaped member having an annular open upper end, having an outer surface that is adapted to face toward a wall on said body surrounding said hole, having an inner surface that diverges radially outwardly in a direction toward said member upper end, and having a bottom surface; and
    a head having an outer rim portion mounted on the upper marginal end portion of said member for rotation therewith, and having a central portion arranged within, and secured to, said rim portion;
    wherein said member is adapted to be inserted into a marginal end portion of said body hole; and
    wherein said central portion is adapted to be forcibly pushed toward said cup-shaped member bottom surface to (a) cause said central portion to physically separate from said rim portion, and (b) cause such separated central portion to movably engage the inner surface of said member to urge said member outer surface to move radially outwardly into engagement with the walls of said body about said opening.

2. An elongated two-piece expandable sealing plug as set forth in claim 1 the hardness of said head is greater than the hardness of said cup-shaped member.

3. An elongated two-piece expandable sealing plug as set forth in claim 1 wherein said member is formed of a material selected from the group consisting of plastisol, vinyl, polyvinyl chloride, an elastomer, and urethane.

4. An elongated two-piece expandable sealing plug as set forth in claim 1 wherein said head is formed of a material selected from the group consisting of high-density polyethylene and nylon.

5. An elongated two-piece expandable sealing plug as set forth in claim 1 wherein said central portion is secured to said rim portion by a plurality of frangible webs spaced therebetween.

6. An elongated two-piece expandable sealing plug as set forth in claim 1 wherein said body hole is internally-threaded, and wherein said member outer surface is externally-threaded.

7. An elongated two-piece expandable sealing plug as set forth in claim 6 wherein said member may be axially inserted into the marginal end portion of said body opening.

8. An elongated two-piece expandable sealing plug as set forth in claim 7 wherein axial insertion of said member into the marginal end portion of said body hole is facilitated by the spacing between said body threads and said member threads.

9. An elongated two-piece expandable sealing plug as set forth in claim 7 wherein axial insertion of said member into the marginal end portion of said body hole is facilitated by the hardness of said cup-shaped member.

10. An elongated two-piece expandable sealing plug as set forth in claim 6 wherein said rim portion has a polygonal outer surface that is adapted to be grasped and rotated relative to said body.

11. An elongated two-piece expandable sealing plug as set forth in claim 10 wherein said rim portion may be rotated in one direction to tighten said plug into engagement with said body, and may be rotated in the opposite direction to remove said plug from said body.

12. An elongated two-piece expandable sealing plug as set forth in claim 1 wherein one of said member and rim portion is provided with a recess, and the other of said member and rim portion is provided with a tab, and wherein said tab is adapted to be received in said recess to prevent relative rotation between said member and head.

* * * * *